United States Patent Office 3,804,801
Patented Apr. 16, 1974

3,804,801
FLUOROHYDROCARBON ELASTOMERS
John Day and David Kenneth Thomas, Farnham, Surrey, England, assignors to The Secretary of State for Defence in Her Britannic Majesty's Government of the United Kingdom of Great Britain and Northern Ireland, Whitehall, London, England
No Drawing. Filed Nov. 24, 1971, Ser. No. 201,962
Claims priority, application Great Britain, Nov. 27, 1970, 56,400/70
Int. Cl. C08f 37/02, 37/16
U.S. Cl. 260—42.27               11 Claims

ABSTRACT OF THE DISCLOSURE

A fluorohydrocarbon elastomer composition having improved low temperature properties is provided by including in the composition as plasticizer a fluorosilicone polymer which has been modified by treatment with an amine compound of formula $H_2N(R \cdot NH)_nH$, where R is a divalent lower alkane chain containing not more than eight carbon atoms, and $n$ is an integer from one to five, an an organic peroxide free radical source, to have a specific viscosity in the range 0.03 to 0.06. Preferably the amine compound is triethylene tetramine and the organic peroxide free radical source is 2,5-dimethyl-2,5-ditertiarybutylperoxyhexane. In a typical example the Clash and Berg temperature of a typical vinylidene fluoride/hexafluoropropylene copolymer is reduced from $-17°$ C. to $-32°$ C.

---

The present invention is concerned with fluorohydrocarbon elastomeric compositions.

Flurohydrocarbon elastomers are well known and have advantageous properties regarding stability at high temperatures as exemplified by Viton (registered trademark) elastomers. However such materials do not retain their elastomeric properties to particularly low temperatures. For example a widely used fluorohydrocarbon elastomer, Viton B (registered trademark), shows relatively poor elastomeric properties at $-16°$ C. and cannot in general be used below that temperature in situations where resilience is required.

It is an object of the present invention to provide a modification of fluorohydrocarbon elastomer compositions by which the elastomeric properties may be retained to lower temperatures than with the unmodified compositions whilst still retaining to at least a substantial extent the long term stability of the vulcanizate at elevated temperatures.

In accordance with the present invention a fluorohydrocarbon elastomer composition includes fluorohydrocarbon elastomer, a finely divided magnesia filler, a modified (as hereinafter defined) fluorosilicone polymer having a specific viscosity in the range 0.03 to 0.06, and a curing agent for the said fluorohydrocarbon elastomer.

The specific viscosity of fluorosilicone polymers as quoted in the present specification are determined in solution in ethyl acetate at a concentration of 0.1 g./100 ml. at a temperature of 28° C.

Preferably the modified fluorosilicone polymer is poly-(methyltrifluoropropylsiloxane) which includes sufficient vinyl groups to aid crosslinking, normally 0.10 to 0.20 mole percent of vinyl groups.

Fluorosilicone polymers as normally supplied have specific viscosities greater than those required for inclusion in compositions of the present invention. For example, polymethyl-3,3,3-trifluoropropylsiloxane (obtainable from Dow Corning Co. as LS 420) as normally supplied has a specific viscosity of 0.089 and in accordance with an aspect of the present invention a process for the modification of fluorosilicone polymers is provided.

For the purpose of the present specification the term "modified" fluorosilicone polymer means a fluorosilicone polymer which has been compounded with a proportion of an amine compound of formula $H_2N(R \cdot NH)_nH$ where R is a divalent lower alkane chain containing not more than eight carbon atoms, and preferably two carbon atoms, and $n$ is an integer of one to five, preferably three, and a proportion of an organic peroxide free radical source, which is preferably 2,5-dimethyl-2,5-ditertiarybutylperoxyhexane, and heated to an elevated temperature in the range 150° C. to 200° C. under pressure for a time sufficient to depolymerize the fluorosilicone polymer so that its specific viscosity falls to within the range 0.03 to 0.06.

It will be understood by those skilled in the art that the time of heating and temperature of heating are interdependent and that the same result may be obtained by using for example a relatively low temperature together with a relatively long time as with a relatively high temperature and a relatively short heating time.

In preferred reactions in accordance with this aspect of the present invention the amine compound is triethylene tetramine and is used in a proportion of up to 1.0 part by weight per 100 parts by weight of fluorosilicone polymer and the organic peroxide free radical source is 2,5-dimethyl-2,5-ditertiarybutylperoxyhexane present to the extent of up to 20 parts by weight per 100 parts by weight of fluorosilicone polymer.

It is believed that the fluorosilicone polymer acts as a plasticizer for the fluorohydrocarbon elastomer thereby lowering the temperature at which the fluorohydrocarbon elastomer composition ceases to have sufficient elastomeric properties to be useful. It is also believed that at least some of the fluorosilicone polymer is bonded into the fluorohydrocarbon network because although fluorosilicone polymer is totally soluble in ethyl acetate, only a proportion of the fluorosilicone can be leached out by ethyl acetate.

The term fluorohydrocarbon elastomer is used in the present specification to mean a polymer of fluorine substituted ethylenically unsaturated hydrocarbons having elastomeric properties and includes copolymers, particularly copolymers of vinylidene fluoride and one or more halogenated olefins for example, hexafluoropropylene, pentafluoropropylene, tetrafluoroethylene and chlorotrifluoroethylene.

Specific copolymers to which the present application may be applied include the copolymer of vinylidene fluoride and hexafluoropropylene containing 70 to 30, and preferably 60, mole percent of vinylidene fluoride and 30 to 70, preferably 40, mole percent of hexafluoropropylene, sold for example under the trade name of Viton A, similar copolymers of vinylidene fluoride and hexafluoropropylene containing minor proportions of tetrafluoroethylene, sold for example under the trade name of Viton B and copolymers of vinylidene fluoride a pentafluoropropylene sold under the trade name of Technoflon.

Advantageously fluorohydrocarbon elastomer compositions of the present invention include for each 100 parts by weight of fluorohydrocarbon elastomer; 5 to 30 parts by weight of finely divided magnesia filler, 10 to 40 parts by weight of modified fluorosilicone polymer having a specific viscosity in the range 0.03 to 0.06 and 0.5 to 5.0 parts by weight of curing agent.

The particular curing agent employed does not constitute part of the invention and may be any curing agent such as is commonly used in the art to cure fluorohydrocarbon elastomer compositions, for example dicinnamylidene-1,6-hexanediene or 1,6-hexane diamine carbamate or possibly the triethylene tetramine/p-phenylene diamine mixture disclosed in U.K. patent specification No. 1,161,410.

The composition may be cured by use of customary procedures.

It is to be understood that other materials, e.g. carbon black and pigments, such as are normally added to elastomer compositions may be added to the compositions of the present invention.

Fluorohydrocarbon elastomer compositions of the present invention may be compounded by conventional means upon conventional rubber processing machinery and, in accordance with a second aspect of the present invention, a process for the production of a fluorohydrocarbon elastomer with a finely divided magnesia filler, a modified (as hereinbefore defined) fluorosilicone polymer having a specific viscosity in the range 0.03 to 0.06 and a curing agent for the said fluorohydrocarbon elastomer and curing the said composition. In particular processes of this aspect of the present invention the proportions of the various components of the fluorohydrocarbon elastomer may be varied as hereinabove set forth.

There will now be described, by way of example only, the depolymerization of a fluorosilicone polymer to material of low specific viscosity and the compounding of such material with fluorohydrocarbon elastomer to produce compositions having improved low temperature properties.

EXAMPLE 1

Depolymerization of fluorosilicone

The formulation: Parts by weight

Methyltrifluoropropylsiloxane (LS 420) _____ 100
2,5 - dimethyl - 2,5 - ditertiarybutylperoxyhexane (Varox) _____ 5.0
Triethylene tetramine (TETA) _____ 0.5 was thoroughly compounded on a standard 6″ x 2″ rubber mill, sheeted off and the sheet then placed in a mould. The mould was slightly overfilled so that internal pressure would be applied when the mould was closed. The mould was placed in a heated press at 160° C. and kept for 1 hour at the end of which time the mould and press were allowed to cool under pressure and the material, which will hereinafter be referred to as DP LS 420, removed. This material had a specific viscosity as hereinbefore defined of 0.045.

This depolymerized fluorosilicone was used to prepare fluorohydrocarbon elastomer compositions with the properties described in the following examples.

EXAMPLE 2

The following formulation was compounded in a standard manner: Parts by weight

Fluorohydrocarbon elastomer (vinylidenefluoride/ hexafluoropropylene copolymer ECD–487) ____ 100
Magnesia—finely divided _____ 15
MT Carbon Black _____ 20
DP LS 420 _____ 30
1,6-hexane diamine carbamate (Diak 1) _____ 3.0 and press cured at 160° C. for 1 hour followed by an oven post cure of 24 hours at 200° C.

The properties of this composition are compared in Table 1 with the properties of the parent fluorohydrocarbon elastomer compounded and vulcanized according to normal practice.

TABLE 1

| | Parent fluorohydrocarbon | Modified Composition |
|---|---|---|
| Ultimate tensile strength, p.s.i. | 2,476 | 1,238 |
| M 100, p.s.i. | 621 | 373 |
| Ultimate strain, percent | 425 | 250 |
| Clash & Berg temperature, ° C. | −23 | −34 |

The property M 100 is defined as the force required to extend the rubber by 100% and the Clash & Berg temperature is determined by means well known in the art and in general defines the lowest temperature at which an elastomer displays useful elastomeric properties.

EXAMPLE 3

The following formulation was compounded in a standard manner:

Parts by weight

Fluorohydrocarbon elastomer (Viton B—vinylidene fluoride/hexafluoropropylene copolymer) _____ 100
Magnesia—finely divided _____ 15
DP LS 420 _____ 30
Dicinnamylidene-1,6-hexane diamine (Diak 3) ____ 1.5 and press cured at 150° C. for 1 hour with no post cure.

The properties of this composition are compared in Table 2 with the properties of the parent fluorohydrocarbon elastomer compounded and vulcanized according to normal practice.

TABLE 2

| | Viton B | Modified composition |
|---|---|---|
| Ultimate tensile strength, p.s.i. | 2,177 | 1,317 |
| M 100, p.s.i. | 423 | 103 |
| Ultimate strain, percent | 500 | 863 |
| Clash & Berg temperature, ° C. | −17 | −32 |

EXAMPLE 4

The following formulation was compounded in a standard manner:

Parts by weight

Viton B _____ 100
Magnesia—finely divided _____ 15
DP LS 420 _____ 30
Diak 3 _____ 1.5 and press cured at 150° C. for 30 minutes followed by an oven cure of 24 hours at 200° C.

The properties of this composition are given in Table 3 and may be compared with the properties of the parent fluorohydrocarbon given in Table 1.

TABLE 3

Ultimate tensile strength _____ p.s.i.__ 2350
M 100 _____ do____ 193
Ultimate strain _____ percent 535
Clash & Berg temperature _____ ° C.__ −27

The Clash & Berg temperature of this fluorohydrocarbon elastomer composition was unchanged after it had been heat aged at 200° C. for 7 days.

Further tests were carried out on this formulation; the resistance to hot kerosene is set forth in Table 4 immediately below and the results of stress relaxation tests are set forth in Table 5 and of compression set tests in Table 6.

TABLE 4

| Time of immersion in kerosene at 125° C., hours | Percent soluble in acetone at 28° C. | Swelling ratio in acetone at 28° C. |
|---|---|---|
| 0 | 1.9 | 1.97 |
| 138 | 4.2 | 1.97 |
| 504 | 3.2 | 2.03 |
| 816 | 4.9 | 2.03 |
| 1,104 | 5.0 | 1.95 |

Swelling ratio is defined as the ratio of the dry weight to the swollen weight of a sample of rubber.

The very low fractions soluble in acetone and the virtually unchanged swelling ratio in acetone after exposure to kerosene at 125° C. for up to 1104 hours indicates that the rubber vulcanizate structure is unchanged. By contrast in an identical test a commercial fluorosilicone is completely brittle after about 500 hours.

Table 5 reports the results of continuous and intermittent stress-relaxation tests carried out in air at 110° C. and 120° C.

TABLE 5

| Time in hours | 110° C. | | 120° C. | |
|---|---|---|---|---|
| | Percent of network broken | Percent change overall in network density | Percent of network broken | Percent change overall in network density |
| 50 | 6.3 | +1.1 | 8.3 | +1.1 |
| 100 | 8.4 | +1.6 | 11.3 | +1.8 |
| 150 | 10.1 | +1.8 | 13.7 | +2.8 |
| 200 | 11.9 | +2.3 | 15.9 | +3.5 |

The heat stability of the rubber is shown by its good resistance to thermo-oxidative attack with a particularly low rate of change in network chain density.

Table 6 reports the results of compression set test carried out in air at 100° C. and 120° C. in accordance with British Standard 903 part A6 1957.

TABLE 6

| Time in compression, hours | Percent set | |
|---|---|---|
| | 100° C. | 120° C. |
| 24 | 51.0 | 53.0 |
| 48 | 61.5 | 61.0 |
| 114 | | 78.0 |

The rather high compression set values at 24 hours are typical of low modulus fluorocarbon elastomers and are largely a result of rather slow physical relaxation processes.

What we claim is:

1. A fluorohydrocarbon elastomer composition comprising
   100 parts by weight of fluorohydrocarbon elastomer,
   5 to 30 parts by weight a finely divided magnesia filler,
   10 to 40 parts by weight of a fluorosilicone polymer and
   0.5 to 5 parts by weight of a curing agent for the said fluorohydrocarbon elastomer, the said fluorosilicone having been modified by compounding
   with a proportion of an amine compound of formula $H_2H(R \cdot NH)_nH$ where R is a divalent lower alkane chain containing not more than eight carbon atoms, and $n$ is an integer from one to five, and a proportion of an organic free radical source, and
   heating at an elevated temperature in the range 150° C. to 200° C. under pressure for a time sufficient to depolymerize the fluorosilicone polymer to a specific viscosity within the range from about 0.03 to about 0.06 determined in a solution of ethyl acetate at a concentration of 0.1 g./100 ml. at 28° C.

2. A composition as claimed in claim 1 wherein the fluorohydrocarbon elastomer is selected from the group consisting of copolymers of vinylidene fluoride with one or more comonomers from the group hexafluoropropylene, pentafluoropropylene, tetrafluorethylene and chlorotrifluoroethylene.

3. A composition as claimed in claim 1 wherein the curing agent is selected from the group consisting of dicinnamylidene-1,6-hexanediene, 1,6-hexane diamine carbamate and a triethylene tetramine/p-phenylene diamine mixture.

4. A composition as claimed in claim 1 wherein the fluorosilicone polymer is poly(methyltrifluoropropylsiloxane) which includes 0.10 to 0.20 mole percent of vinyl groups.

5. A composition as claimed in claim 1 wherein the amine compound is triethylene tetramine and is used in a proportion of up to one part by weight per hundred parts by weight of fluorosilicone polymer.

6. A composition as claimed in claim 1 wherein the organic peroxide free radical source is 2,5-dimethyl-2, 5-ditertiarybutylperoxyhexane and is present to the extent of up to 20 parts by weight of fluoro-silicone polymer and the amine compound is triethylene tetramine present to the extent of up to 0.5 part by weight per hundred parts by weight of fluorosilicone polymer.

7. A composition as claimed in claim 1 after cure.

8. A process for the modification of a fluorosilicone polymer which includes the step of compounding the said fluorosilicone polymer with a proportion of an amine compound of formula $H_2H(R \cdot NH)_nH$ where R is a divalent lower alkane chain containing not more than eight carbon atoms, and $n$ is an integer from one to five, and a proportion of an organic free radical source, and heating at an elevated temperature in the range of from about 150° C. to about 200° C. under pressure for a time sufficient to depolymerize the fluorosilicone polymer to a specific viscosity within the range 0.03 to 0.06.

9. A process as claimed in claim 8 wherein the amine compound is triethylene tetramine and is used in a proportion of up to one part by weight per hundred parts by weight of fluorosilicone polymer.

10. A process as claimed in claim 8 wherein the organic peroxide free radical source is 2,5-dimethyl-2,5-ditertiarybutylperoxyhexane and is present to the extent of up to 20 parts by weight of fluorosilicone polymer and the amine compound is triethylene tetramine present to the extent of up to 0.5 part by weight per hundred parts by weight of fluorosilicone polymer.

11. A process as claimed in claim 8 wherein the fluorosilicone polymer is poly(methyltrifluoropropylsiloxane) which includes 0.10 to 0.20 mole percent of vinyl groups.

References Cited

UNITED STATES PATENTS

| 3,632,788 | 1/1972 | Stivers | 260—30.8 R |
| 3,630,982 | 12/1971 | Matherly | 260—29.1 SB |
| 3,192,175 | 6/1965 | Russell | 260—29.1 |
| 3,122,521 | 2/1964 | Pierce | 260—46.5 |
| 3,538,028 | 11/1970 | Morgan | 260—23 |

MORRIS LIEBMAN, Primary Examiner

R. ZAITLEN, Assistant Examiner

U.S. Cl. X.R.

260—29.1 S, 46.5 G, 827